United States Patent
Nakamura

(10) Patent No.: US 9,904,950 B2
(45) Date of Patent: Feb. 27, 2018

(54) INFORMATION PROCESSING SYSTEM, INFORMATION PROCESSING DEVICE, AND INFORMATION PROCESSING METHOD

(71) Applicant: Takashi Nakamura, Kanagawa (JP)

(72) Inventor: Takashi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 720 days.

(21) Appl. No.: 14/273,746

(22) Filed: May 9, 2014

(65) Prior Publication Data
US 2014/0344107 A1 Nov. 20, 2014

(30) Foreign Application Priority Data
May 16, 2013 (JP) ................. 2013-104529

(51) Int. Cl.
*G06Q 30/06* (2012.01)

(52) U.S. Cl.
CPC ..... *G06Q 30/0633* (2013.01); *G06Q 30/0641* (2013.01)

(58) Field of Classification Search
CPC ............. G06Q 30/0633; G06Q 30/0641
USPC ............................ 705/26.1, 27.1
See application file for complete search history.

(56) References Cited

U.S. PATENT DOCUMENTS 6,985,877 B1 * 1/2006 Hayward ......... G06Q 10/06395
399/12
7,487,112 B2 * 2/2009 Barnes, Jr. ............. G06Q 10/02
705/26.8

(Continued)

FOREIGN PATENT DOCUMENTS

JP 2003-084953 3/2003
JP 2003-309660 A 10/2003

(Continued)

OTHER PUBLICATIONS

Office Action dated Jun. 20, 2017, in Japanese Patent Application No. 2013-104529.

*Primary Examiner* — Yogesh C Garg
(74) *Attorney, Agent, or Firm* — Oblon, McClelland, Maier & Neustadt, L.L.P.

(57) ABSTRACT

A system includes a notification unit configured to notify a server device of device information including identifying information for identifying an information processing device; a storage unit configured to store the identifying information and consumable article information that indicates a consumable article available in the information processing device identified by the identifying information so that each type of the identifying information is associated with the corresponding consumable article information; a specifying unit configured to specify, among a plurality of pieces of consumable article information stored in the storage unit, a piece of consumable article information associated with the identifying information included in the device information notified by the notification unit; a generator configured to generate an order image that encourages an order of a consumable article indicated by the piece of consumable article information specified by the first specifying unit; and a display unit configured to display the order image.

10 Claims, 11 Drawing Sheets

(56) References Cited

U.S. PATENT DOCUMENTS

| | | | |
|---|---|---|---|
| 8,924,262 B2* | 12/2014 | Shuster | G06Q 30/0601 |
| | | | 221/7 |
| 2003/0229551 A1* | 12/2003 | Kobayashi | G06Q 10/087 |
| | | | 705/28 |
| 2006/0168005 A1 | 7/2006 | Kanbara et al. | |
| 2008/0126228 A1* | 5/2008 | Nagai | G06Q 10/00 |
| | | | 705/28 |

FOREIGN PATENT DOCUMENTS

| | | |
|---|---|---|
| JP | 2004-303158 | 10/2004 |
| JP | 2005-018742 | 1/2005 |
| JP | 2008-159022 A | 7/2008 |
| JP | 2010-058427 | 3/2010 |
| JP | 2013-049153 | 3/2013 |

* cited by examiner

FIG.6

| x. DEVICE IDENTIFYING INFORMATION | |
|---|---|
| PRODUCT NAME | MFP2013 |
| DEVICE SPECIFIC SERIAL NUMBER | 2013-04-0001 |

FIG.7

| y. REMAINING QUANTITY INFORMATION | | | | | |
|---|---|---|---|---|---|
| T-B | 20% | T-M | 80% | P-A3 | 80% |
| T-C | 80% | T-Y | 80% | P-A4 | 60% |

FIG.9

| a. CONTRACT INFORMATION TABLE | CONTRACT TARGET INFORMATION | DEVICE SPECIFIC SERIAL NUMBER | CONTRACT STYLE INFORMATION | ACCOUNT NAME | PASSWORD |
|---|---|---|---|---|---|
| | Y OFFICE OF X COMPANY | 2013-04-0001 | A | **@*.co.jp | ******** |
| | Y OFFICE OF X COMPANY | 2013-04-0002 | A | **@*.co.jp | ******* |
| | Z COMPANY | 2013-04-0100 | B | **@*.co.jp | ********* |

FIG.10

| b. CONSUMABLE ARTICLE INFORMATION TABLE | CONSUMABLE ARTICLE INFORMATION | ARTICLE CLASSIFI-CATION INFORMATION | CONTRACT STYLE INFORMA-TION | PRICE INFORMA-TION | PRODUCT NAME |
|---|---|---|---|---|---|
| | TONER 2013 BLACK | T | A | ¥10,000 | MFP2013, MFP2012 |
| | TONER 2013 CYAN | T | A | ¥10,000 | MFP2013, MFP2012 |
| | TONER 2013 MAGENTA | T | A | ¥10,000 | MFP2013, MFP2012 |
| | TONER 2013 YELLOW | T | A | ¥10,000 | MFP2013, MFP2012 |
| | TONER 2013 BLACK | T | B | ¥20,000 | MFP2013 |
| | TONER 2013 CYAN | T | B | ¥20,000 | MFP2013 |
| | TONER 2013 MAGENTA | T | B | ¥20,000 | MFP2013 |
| | TONER 2013 YELLOW | T | B | ¥20,000 | MFP2013 |
| | HIGH QUALITY PAPER IN A3 | P | A | ¥1,000 | MFP2013 |
| | HIGH QUALITY PAPER IN A4 | P | A | ¥500 | MFP2013, MFP2012 |
| | HIGH QUALITY PAPER IN A3 | P | B | ¥2,000 | MFP2013 |
| | HIGH QUALITY PAPER IN A4 | P | B | ¥1,000 | MFP2013, MFP2012 |

FIG.11

ORDER IMAGE

| Y OFFICE OF X COMPANY MFP2013 | | | ANNOUNCING INFORMATION |
|---|---|---|---|
| ○ | TONER 2013 BLACK | ¥10,000 | ALMOST EMPTY |
| ○ | TONER 2013 CYAN | ¥10,000 | |
| ○ | TONER 2013 MAGENTA | ¥10,000 | |
| ○ | TONER 2013 YELLOW | ¥10,000 | |

ORDER

INFORMATION PROCESSING SYSTEM, INFORMATION PROCESSING DEVICE, AND INFORMATION PROCESSING METHOD

CROSS-REFERENCE TO RELATED APPLICATION

The present application claims priority to and incorporates by reference the entire contents of Japanese Patent Application No. 2013-104529 filed in Japan on May 16, 2013.

BACKGROUND OF THE INVENTION

1. Field of the Invention

The present invention relates to a system, a device, and a method for information processing.

2. Description of the Related Art

Japanese Laid-open Patent Publication No. 2005-018742 discloses an image forming device utilization system provided with an image forming device including a touch sensitive panel and an office supply server connected to the image forming device, for example. In the image forming device utilization system, once a user is authenticated, a screen (order screen) that encourages the user to place an order is displayed on the touch sensitive panel by presenting a variety of articles, including consumable articles such as toner and paper and other supplies dealt with by an office supply server and their prices, and the user is able to place an order by selecting any desired article for purchase.

However, since not only consumable articles that is available (can be equipped) in the image forming device used by the user but also other consumable articles that are specialized in for other devices can be presented in the order screen, it is necessary for the user to find out consumable articles that are available in the image forming device used by the user among the variety of articles presented in the order screen in the technique disclosed in Japanese Laid-open Patent Publication No. 2005-018742. There is therefore a problem of involving inconvenience for users.

Therefore, there is a need for a system, a device, and a method for information processing which are capable of improving convenience for users.

SUMMARY OF THE INVENTION

It is an object of the present invention to at least partially solve the problem in the conventional technology.

According to an embodiment, there is provided an information processing system that includes a notification unit configured to notify a server device of device information including identifying information for identifying an information processing device; a storage unit configured to store the identifying information and consumable article information that indicates a consumable article available in the information processing device identified by the identifying information so that each type of the identifying information is associated with the corresponding consumable article information; a first specifying unit configured to specify, among a plurality of pieces of consumable article information stored in the storage unit, a piece of consumable article information associated with the identifying information included in the device information notified by the notification unit; a generator configured to generate an order image that encourages an order of a consumable article indicated by the piece of consumable article information specified by the first specifying unit; and a display unit configured to display the order image.

According to another embodiment, there is provided an information processing device that includes a notification unit configured to notify a server device of identifying information for identifying the information processing device; an order image obtaining unit configured to obtain, from the server device, an order image that encourages an order of a consumable article indicated by a piece of consumable article information associated with the identifying information notified by the notification unit, the piece of consumable article information being one of a plurality of pieces of consumable article information that are included in associated information in which each type of the identifying information is associated with a piece of consumable article information that indicates a consumable article available in the information processing device identified by the identifying information; and a display unit configured to display the order image.

According to still another embodiment, there is provided an information processing method that includes notifying a server device of identifying information for identifying an information processing device; obtaining, from the server device, an order image that encourages an order of a consumable article indicated by a piece of consumable article information associated with the identifying information, the piece of consumable article information being one of a plurality of pieces of consumable article information that are included in associated information in which each type of the identifying information is associated with a piece of consumable article information that indicates a consumable article available in the information processing device identified by the identifying information; and displaying the order image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 illustrates an example of a data format of device identifying information;

FIG. 7 illustrates an example of a data format of remaining quantity information;

FIG. 9 illustrates an example of a contract information table;

FIG. 10 illustrates an example of a consumable article information table;

FIG. 11 illustrates an example of an order image;

DETAILED DESCRIPTION OF THE PREFERRED EMBODIMENTS

An embodiment of a system, a device, a method, and a program for information processing according to the present invention will be explained in detail below with reference to the accompanying drawings. While a case of applying an information processing device according to the present invention to a multifunction peripheral (MFP) is taken as an example in the explanation below, the present invention is not limited thereto. Here, the multifunction peripheral includes at least two functions among a printing function, a copying function, a scanning function, and a facsimile function.

Figure 1:
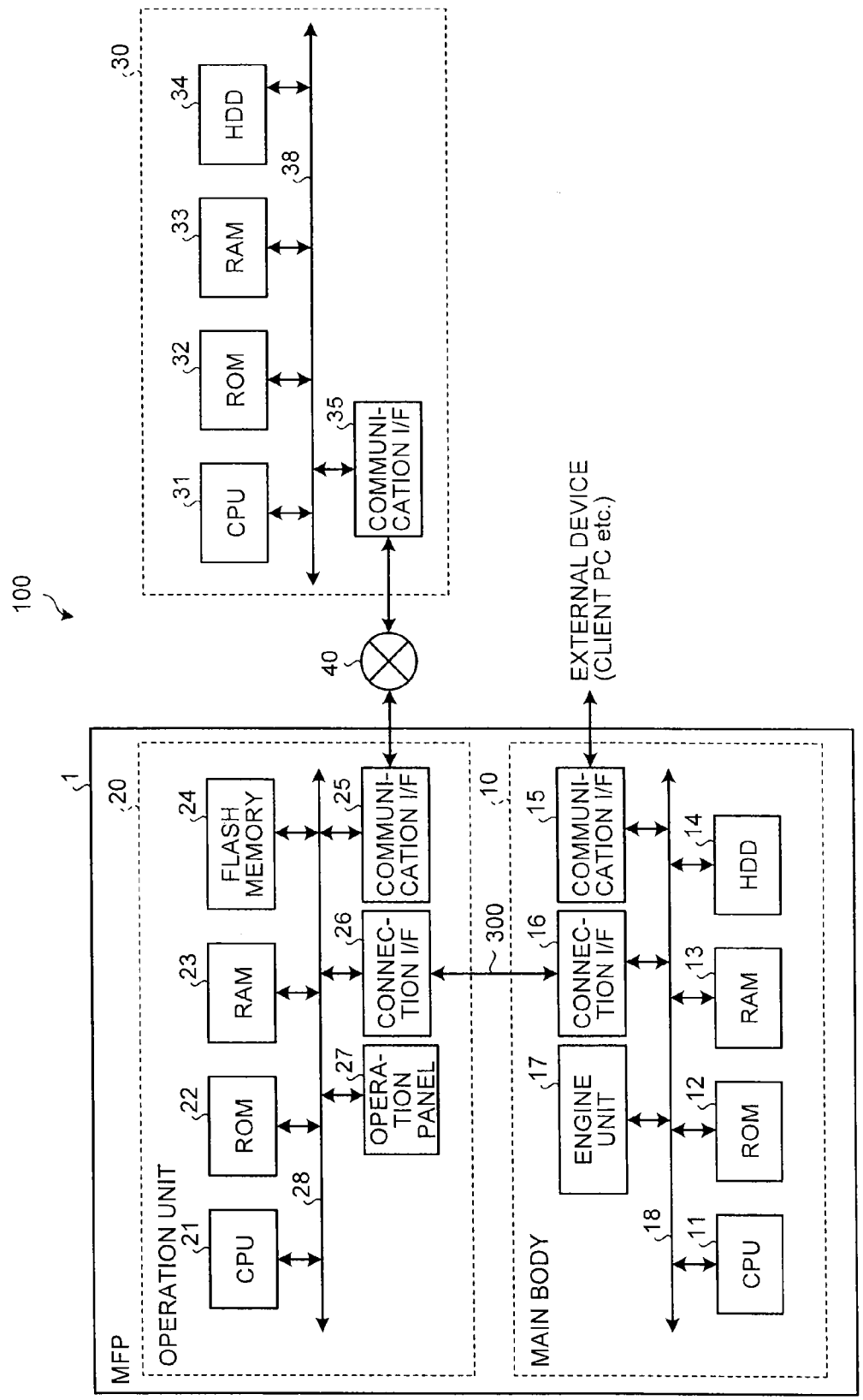
FIG. 1 illustrates an example of a hardware configuration of an information processing system.

FIG. 1 is a block diagram illustrating an example of a hardware configuration of an information processing system 100 according to the embodiment. As illustrated in FIG. 1, an information processing system 100 is provided with an MFP 1 and a server device 30. The MFP 1 is connected to the server device 30 via a network 40 such as the Internet. While an example of one MFP connected to the server device 30 is illustrated in FIG. 1, the configuration is not limited thereto and the number of MFPs may be set arbitrarily.

As illustrated in FIG. 1, the MFP 1 is provided with a main body 10 capable of realizing a variety of functions including a copying function, a scanning function, a facsimile function, and a printing function and an operation unit 20 that receives an input appropriate to an operation by a user. The main body 10 and the operation unit 20 are connected via a dedicated communication channel 300 so that a communication therebetween is enabled. For the communication channel 300, while a universal serial bus (USB) standard may be adopted for example, an arbitrary standard may be adopted irrespective of wired or wireless connection.

The main body 10 is capable of operating in accordance with an input received in the operation unit 20. The main body 10 is enabled to communicate with an external device such as a client personal computer (PC) and to operate in accordance with an instruction received from the external device.

Next, a hardware configuration of the main body 10 will be explained. As illustrated in FIG. 1, the main body 10 is provided with a CPU 11, a ROM 12, a RAM 13, a hard disk drive (HDD) 14, a communication interface (I/F) 15, a connection I/F 16, and an engine unit 17, which are connected to each other via a system bus 18.

The CPU 11 totally controls an operation of the main body 10. The CPU 11 uses the RAM 13 as a work area (work space) and executes programs stored in the ROM 12 or the HDD 14 to control the entire operation of the main body 10 and realize various functions including the copying function, the scanning function, the facsimile function, and the printing function.

The communication I/F 15 is an interface that enables a communication with an external device such as a client personal PC. The connection I/F 16 is an interface that enables a communication with the operation unit 20 via the communication channel 300.

The engine unit 17 is a hardware that performs a processing, except for a versatile information processing and a communication, for realizing the copying function, the scanning function, the facsimile function, and the printing function. For example, the engine unit 17 is provided with a scanner (image reading unit) that scans and reads out an image of a document, a plotter (an image forming unit) that performs printing onto a sheet member such as paper, and a facsimile unit that performs a facsimile communication. The engine unit 17 may further be provided with a special option such as a finisher that sorts printed sheet members and an automatic document feeder (ADF) that automatically feeds a document.

Next, a hardware configuration of the operation unit 20 will be explained. As illustrated in FIG. 1, the operation unit 20 is provided with a CPU 21, a ROM 22, a RAM 23, a flash memory 24, a communication I/F 25, a connection I/F 26, and an operation panel 27, which are connected to each other via a system bus 28.

The CPU 21 totally controls an operation of the operation unit 20. The CPU 21 uses the RAM 23 as a work area (work space) and executes programs stored in the ROM 22 or the flash memory 24 to control the entire operation of the operation unit 20 and realize various functions, which will be explained later, including a display of information (image) in accordance with an input received from a user.

The communication I/F 25 is an interface that enables a communication with the server device 30 via the network 40. The connection I/F 26 is an interface that enables a communication with the main body 10 via the communication channel 300.

The operation panel 27 receives inputs of various kinds in accordance with operations by a user and displays information of various kinds, for example, information appropriate to a received input, information indicating an operational status of the MFP 1, and information indicating a setting condition. While the operation panel 27 is configured by a liquid crystal display (LCD) device equipped with a touch sensitive panel function in this example, the configuration is not limited thereto. For example, the operation panel 27 may be configured by an organic EL display device equipped with the touch sensitive panel function. Moreover, an operation unit such as a hardware key and a display unit such as a lamp may be provided in addition to this or in place of this.

Next, a hardware configuration of the server device 30 will be explained. As illustrated in FIG. 1, the server device 30 is provided with a CPU 31, a ROM 32, a RAM 33, a hard disk drive (HDD) 34, and a communication interface (I/F) 35, which are connected to each other via a system bus 38.

The CPU 31 totally controls an operation of the server device 30. The CPU 31 uses the RAM 33 as a work area (work space) and executes programs stored in the ROM 32 or the HDD 34 to control the entire operation of the server device 30 and realize various functions, which will be explained later. The communication I/F 35 is an interface that enables a communication with the operation unit 20 via the network 40.

Figure 2:
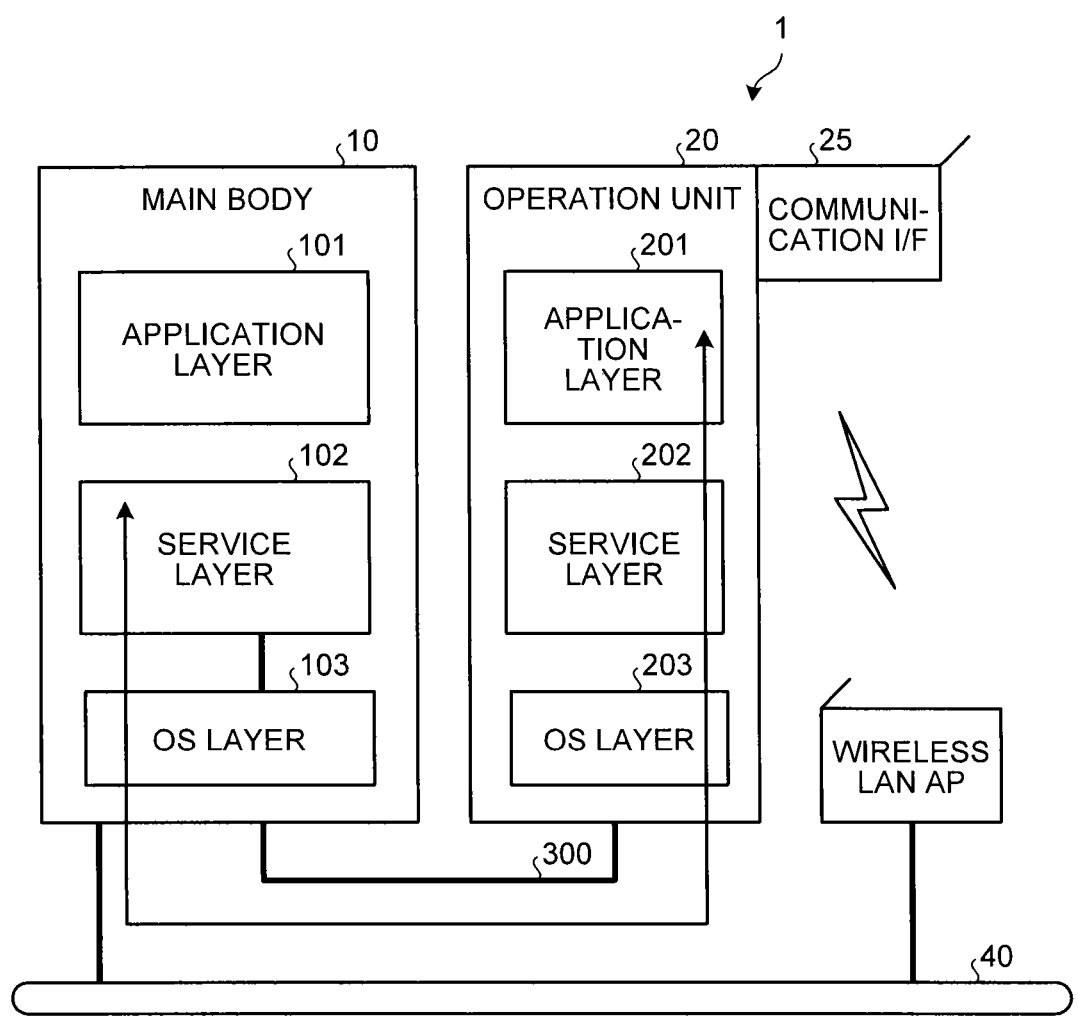
FIG. 2 illustrates an example of a software configuration of an MFP.

Next, a software configuration of the MFP 1 will be explained. FIG. 2 schematically illustrates an example of a software configuration of the MFP 1. As illustrated in FIG. 2, the main body 10 is provided with an application layer 101, a service layer 102, and an OS layer 103. The substances of the application layer 101, the service layer 102, and the OS layer 103 are various softwares stored in the ROM 12 and the HDD 14. The CPU 11 executes these softwares, so that various functions are provided.

A software of the application layer 101 is an application software (hereinafter sometimes simply referred to as "application" in the explanation below) for providing a predetermined function by operating a hardware resource. For such applications, there are a copy application that provides a copying function, a scanner application that provides a scanning function, a facsimile application that provides a facsimile function, and a printer application that provides a printing function, for example.

A software of the service layer 102 intervenes between the application layer 101 and the OS layer 103 and provides, with respect to an application, an interface that enables using a hardware resource provided in the main body 10. More specifically, the software of the service layer 102 provides a function of receiving an operation request to the hardware resource and performing an arbitration of operation requests. The operation request received by the service layer 102 includes a request for scanning by a scanner and a request for printing by a plotter.

The interface function by the service layer 102 is provided not only to the application layer 101 of the main body 10 but also to an application layer 201 of the operation unit 20. Specifically, the application layer 201 (application) of the operation unit 20 is also able to realize functions using the hardware resource (the engine unit 17) of the main body 10 via the interface function of the service layer 102.

A software of the OS layer 103 is a basic software (operating system) for providing a basic function of controlling the hardware provided in the main body 10. The software of the service layer 102 converts a request for using the hardware resource from applications of various kinds into a command which can be interpreted by the OS layer 103 and passes the command to the OS layer 103. The software of the OS layer 103 executes the command, so that the hardware resource operates in accordance with the request from the applications.

Similarly, the operation unit 20 is provided with the application layer 201, a service layer 202, and an OS layer 203. The hierarchical structure of the application layer 201, the service layer 202, and the OS layer 203 of the operation unit 20 is the same as that of the main body 10. However, the functions provided by the applications of the application layer 201 and the kinds of the operation requests which can be received by the service layer 202 are different from those of the main body 10. While an application of the application layer 201 may be a software for operating the hardware resource provided in the operation unit 20 and providing a predetermined function, the application of the application layer 201 is a software chiefly for providing: a function as a user interface (UI) that allows an operation and a display with regard to functions, i.e., the copying function, the scanning function, the facsimile function, and the printing function, provided in the main body 10; and a function of ordering and selling consumable articles such as toner and paper to be used in the MFP 1.

To maintain an independence in function in the embodiment, the software of the OS layer 103 of the main body 10 is different from the software of the OS layer 203 of the operation unit 20. In other words, the main body 10 and the operation unit 20 independently operate with each other by separated operating systems. For example, the Linux® may be used for the software of the OS layer 103 of the main body 10 and the Android® may be used for the software of the OS layer 203 of the operation unit 20.

Since the main body 10 and the operation unit 20 operate by separated operating systems in the MFP 1 according to the embodiment as explained above, the communication between the main body 10 and the operation unit 20 is performed not as an inter-process communication within a common device but as a communication between different devices. A transmission operation (command communication) to the main body 10 an input received by the operation unit 20 (a content instructed by a user) and an operation, by the main body 10, of notifying the operation unit 20 of an event fall under the category of this. Here, the function of the main body 10 can be used when the operation unit 20 performs a command communication with respect to the main body 10. The event to be notified by the main body 10 to the operation unit 20 includes an execution status of the operation in the main body 10 and a content which is set in the main body 10.

Since the power is supplied to the operation unit 20 from the main body 10 via the communication channel 300 in the embodiment, it is possible to control a power source of the operation unit 20 separately (independently) from the control of the power source of the main body 10.

Figure 3:
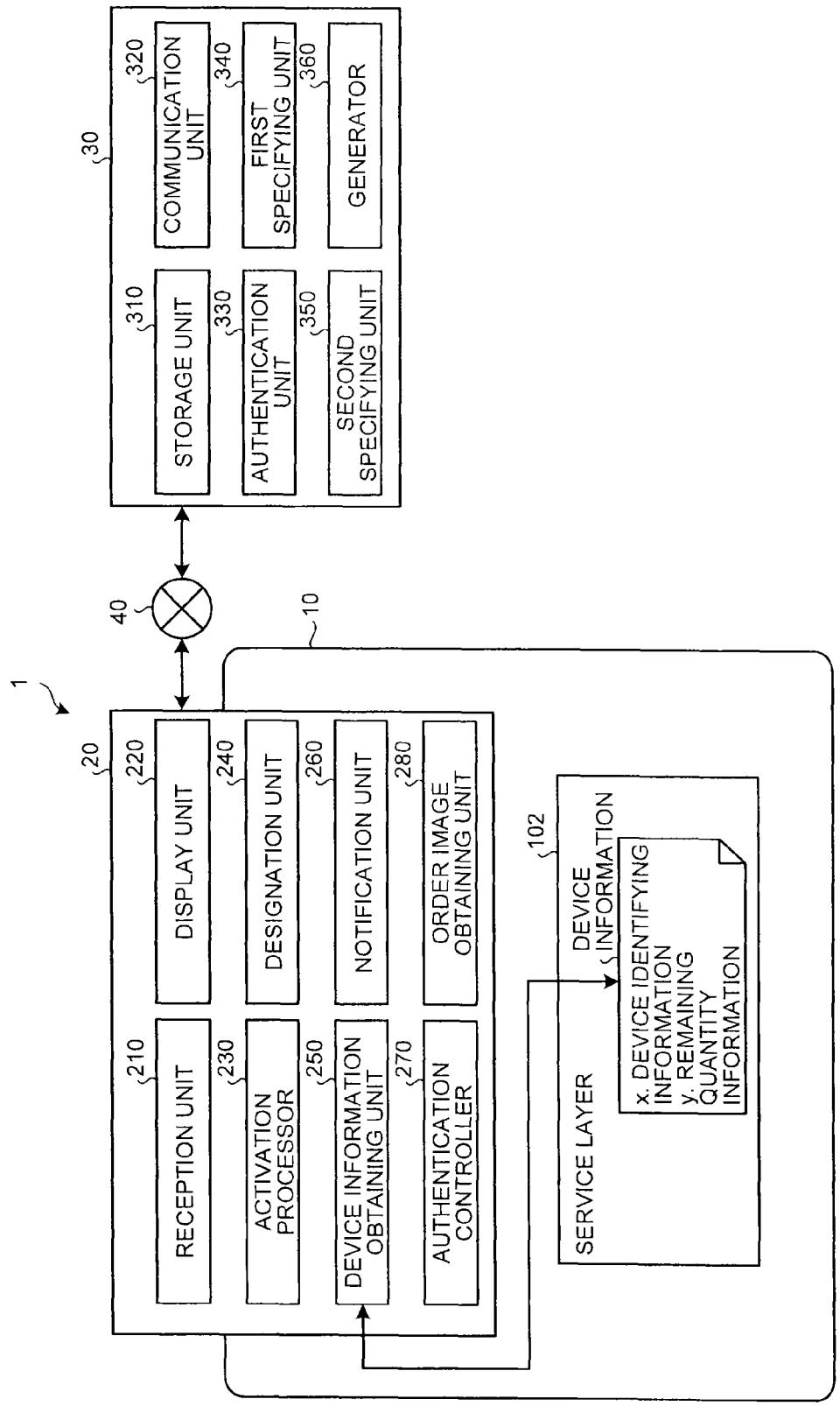
FIG. 3 illustrates an example of a functional configuration of an MFP and a server device.

Next, functions of the MFP 1 and the server device 30 will be explained. FIG. 3 illustrates an example of a functional configuration of the MFP 1 and the server device 30 according to the embodiment. A function regarding an application for providing a function of ordering and selling consumable articles such as toner and paper to be used in the MFP 1 will be mainly explained below (hereinafter referred to as "consumable article purchase application" in the explanation below).

A function of the MFP 1 will be explained, first. As illustrated in FIG. 3, the operation unit 20 is provided with a reception unit 210, a display unit 220, an activation processor 230, a designation unit 240, a device information obtaining unit 250, a notification unit 260, an authentication controller 270, and an order image obtaining unit 280.

The reception unit 210 receives various inputs. In this example, the reception unit 210 receives an input through a touch operation by a user onto a screen (a surface on which an image is displayed) of the operation panel 27 equipped with a touch sensitive panel function.

Figure 4:
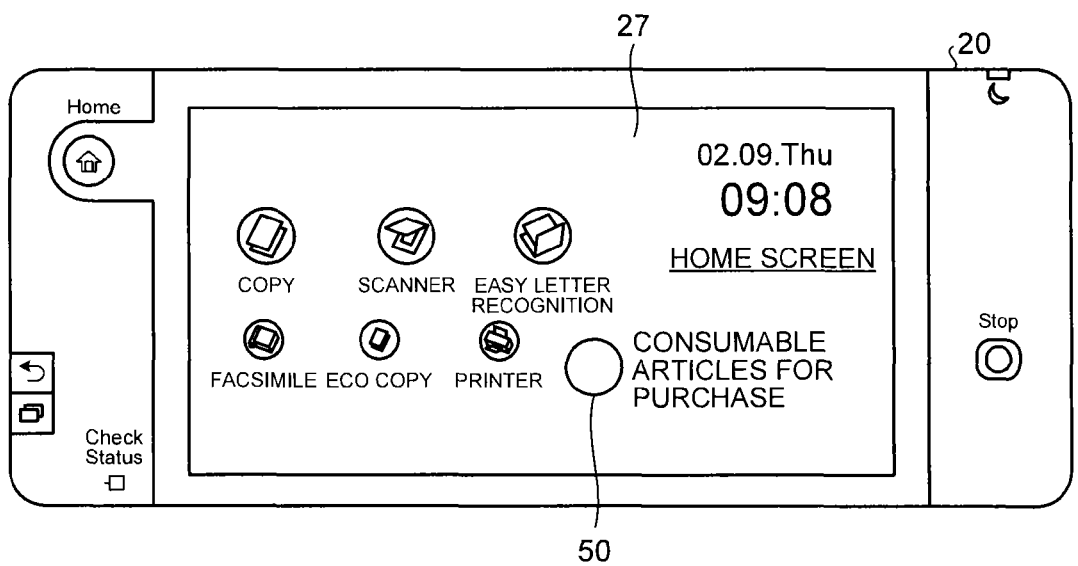
FIG. 4 illustrates an example of a home screen.

The display unit 220 performs a control of displaying various images on the operation panel 27. Right after the start-up of the MFP 1 or in a state where no operation is performed, the display unit 220 performs a control of displaying a home screen as illustrated in FIG. 4 on the operation panel 27. As illustrated in FIG. 4, a plurality of icons corresponding to a plurality of kinds of applications one on one are displayed on the home screen. In the embodiment, the consumable article purchase application is installed in the application layer 201 of the operation unit 20 and an icon 50 corresponding to the consumable article purchase application is displayed on the home screen.

Figure 5:
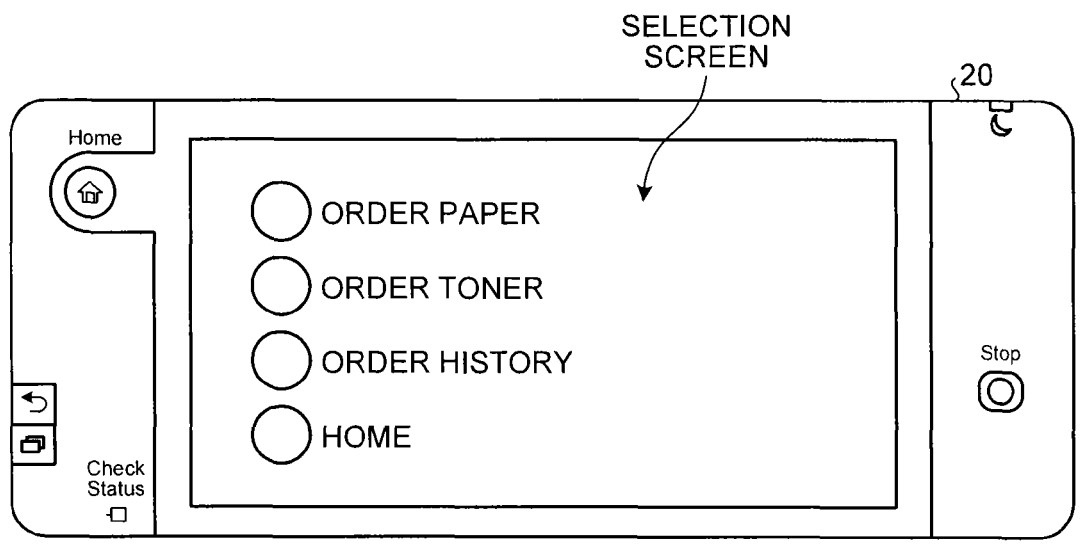
FIG. 5 illustrates an example of a selection screen which is displayed right after an activation of a consumable article purchase application.

The explanation will be continued back to FIG. 3. The activation processor 230 activates any one of applications in accordance with an input by a user. In receiving an input through a touch operation onto any one of icons in the reception unit 210 in the state where the home screen is displayed in the embodiment, the activation processor 230 performs a control of activating the icon on which the touch operation is performed. When the user performs a touch operation of touching the icon 50 corresponding to the consumable article purchase application, for example, the activation processor 230 performs a control of activating the consumable article purchase application. In this example, the display unit 220 performs a control of displaying a selection screen that encourages a selection of any one of: a designation of classification of consumable articles to order (two goods "toner" and "paper" are prepared in this example for article classification); a display of an order history; and a transition to the home screen as illustrated in FIG. 5 when the consumable article purchase application is activated.

The explanation will be continued back to FIG. 3. The designation unit 240 designates (determines) article classification information which indicates the classification of consumable articles in accordance with the input by the user. In receiving an input of designating a toner for the classification of consumable articles to order in the selection screen illustrated in FIG. 5 for example, the designation unit 240 designates article classification information which indicates that the article classification is "toner".

The explanation will be continued back to FIG. 3. The device information obtaining unit 250 obtains from the main body 10 device information including identifying information that identifies the MFP 1. More specifically, the device information obtaining unit 250 requests device information from the service layer 102 of the main body 10. The device information stored in a not illustrated memory in the main body 10 is read out by the service layer 102 of the main body 10 having received this request and transmitted to the device information obtaining unit 250.

The device information in the embodiment includes device identifying information and remaining quantity information which indicates remaining quantity of consumable articles equipped in the MFP 1. The device identifying information will be explained first. The device identifying information includes identifying information which identifies the MFP 1 and specific information which indicates information specific to the MFP 1. FIG. 6 schematically illustrates an example of a data format of device identifying information. As illustrated in FIG. 6, the device identifying information includes a product name that identifies the MFP 1 and a device specific serial number which indicates information specific to the MFP 1. In the example in FIG. 6, the device identifying information includes a product name "MFP2013" and a device specific serial number "2013-04-0001". While the product name is an example of the identifying information and the device specific serial number is an example of the specific information, the present invention is not limited thereto.

Next, the remaining quantity information will be explained. In this example, there are two classifications for consumable articles, i.e., "toner" and "paper" available in the MFP 1 for the convenience of the explanation, and article classification information indicating that the article classification is "toner" is sometimes described as "T" and article classification information indicating that the article classification is "paper" is sometimes described as "P". There are four kinds in total, i.e. "black toner", "cyan toner", "magenta toner", and "yellow toner", for the "toner". Besides, there are two kinds in total, i.e., "high quality paper in A3" and "high quality paper in A4" for the "paper".

FIG. 7 schematically illustrates an example of a data format of remaining quantity information. In the example in FIG. 7, the "black toner" is described as "T-B", the "cyan toner" is described as "T-C", the "magenta toner" is described as "T-M", and the "yellow toner" is described as "T-Y". In the example in FIG. 7, the "high quality paper in A3" is described as "P-A3" and the "high quality paper in A4" is described as "P-A4". The example in FIG. 7 shows that the remaining quantity of the "black toner (T-B)" is 20%, the remaining quantity of the "cyan toner (T-C)" is 80%, the remaining quantity of the "magenta toner (T-M)" is 80%, and the remaining quantity of the "yellow toner (T-Y)" is 80%. Besides, the example shows that the remaining quantity of the "high quality paper in A3 (P-A3)" is 80% and the remaining quantity of the "high quality paper in A4 (P-A4)" is 60%.

The explanation will be continued back to FIG. 3. The notification unit 260 notifies the server device 30 of the device information including the identifying information that identifies the MFP 1. In the embodiment, the notification unit 260 notifies (transmits), to the server device 30, information (hereinafter referred to as "specifying information") including the device information obtained by the device information obtaining unit 250 and the article classification information designated by the designation unit 240.

Figure 8:
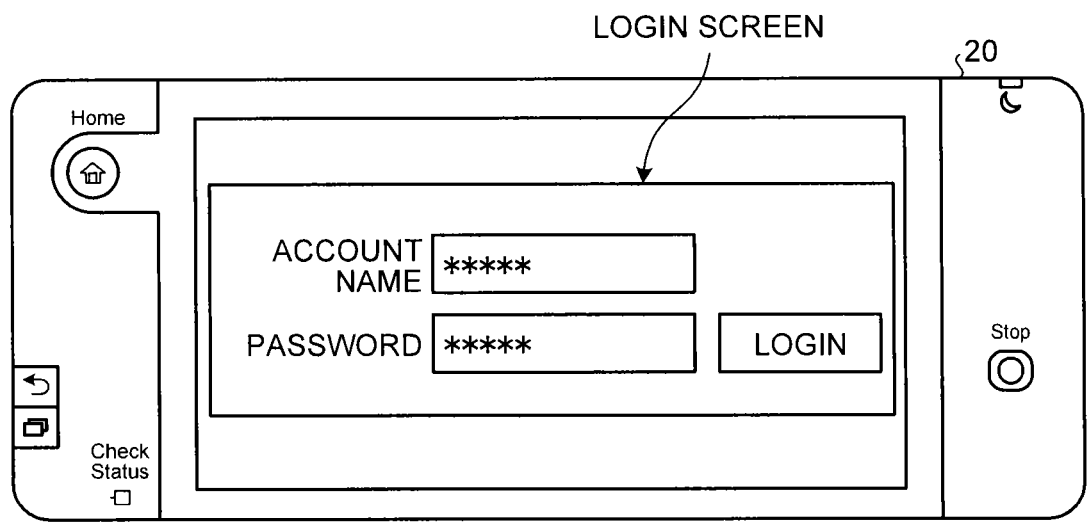
FIG. 8 illustrates an example of a login screen.

The authentication controller 270 controls a user authentication. In the embodiment, the authentication controller 270 receives a request from the server device 30 which will be explained later and instructs the display unit 220 to display a login screen which encourages an input of user identifying information to be used for user authentication. While the user identifying information includes an account name allotted for each user and a password in this example, the present invention is not limited thereto. FIG. 8 illustrates an example of a login screen. In receiving an input of an account name and a password, the authentication controller 270 performs a control of transmitting the set of the received account name and the password (user identifying information) to the server device 30.

The explanation will be continued back to FIG. 3. The order image obtaining unit 280 obtains an order image from the server device 30. In the embodiment, the order image obtaining unit 280 requests an order image from the server device 30 when receiving, from the server device 30, an authentication result which indicates that the user is appropriately authenticated and will be explained later. When obtaining the order image from the server device 30, the order image obtaining unit 280 instructs the display unit 220 to display the obtained order image. A specific content of the order image will be explained later.

While the CPU 21 uses the RAM 23 as a work area (work space) and executes programs stored in the ROM 22 or the flash memory 24 to realize the functions of the reception unit 210, the display unit 220, the activation processor 230, the designation unit 240, the device information obtaining unit 250, the notification unit 260, the authentication controller 270, and the order image obtaining unit 280 explained above, the present invention is not limited thereto and at least a part of the functions of the units of the operation unit 20 may be, for example, realized by a dedicated hardware circuit (semiconductor integrated circuit and the like, for example).

The function of the server device 30 will be explained next. As illustrated in FIG. 3, the server device 30 is provided with a storage unit 310, a communication unit 320, an authentication unit 330, a first specifying unit 340, a second specifying unit 350, and a generator 360.

The storage unit 310 stores a plurality types of identifying information (the respective product names in this example) and a plurality of pieces of consumable article information which each indicate a consumable article which is available in an MFP identified by the corresponding identifying information so that each type of the identifying information is associated with the corresponding piece of consumable article information, respectively. More specifically, the storage unit 310 stores the identifying information, contract style information that indicates a contract style type of the MFP identified by the corresponding identifying information, the consumable article information, and price information that indicates a price of a consumable article so that each type of the identifying information is associated with the corresponding contract style information, the corresponding consumable article information, and the corresponding price information (see FIG. 10 which will be explained later). To explain it still more specifically, the storage unit 310 stores the identifying information, article classification information, the contract style information, the consumable article information, and the price information so that each type of the identifying information is associated with the corresponding article classification information, the corresponding contract style information, the corresponding consumable article information, and the corresponding price information (see FIG. 10).

Here, the contract style includes a contract style of a maintenance and support service for an MFP, for example. For this maintenance and support service contract style, considered are a regular contract on which troubles including an exchange of consumable articles are repaired with no charge within a predetermined contract period and a spot contract on which, while inspections are performed as often as specified in advance by a visit of a service person, an exchange of consumable articles is to be charged, for example.

As one example, assumed are two kinds of contract styles: a spot contract on which the number of visits by a service person is set to a predetermined value; and another sport contract on which the number of visits by a service person is set to a value larger than the predetermined value in the embodiment. In the explanation below, contract style information indicating the spot contract on which the number of visits by a service person is set to the predetermined value is sometimes described as "A" and contract style information indicating the spot contract on which the number of visits is set to a value larger than the predetermined value is sometimes described as "B". The prices indicated by price information stored in the storage unit 310 are set to be different depending on contract style information associated with the price information. Since a manpower cost for the service person is budgeted more in the case where the corresponding contract style information is "B" than the case where the corresponding contract style information is "A" (the number of visits by the service person in "B" is larger than "A"), a higher price for a consumable article is set, for example.

A specific content of the storage unit 310 according to the embodiment will be explained below. The storage unit 310 stores a contract information table illustrated in FIG. 9 and a consumable article information table illustrated in FIG. 10 in the embodiment.

FIG. 9 illustrates a data format of the contract information table. As illustrated in FIG. 9, contract target information indicating a contract target, a device specific serial number, contract style information, account name, and a password are associated and stored in the contract information table.

FIG. 10 illustrates a data format of the consumable article information table. As illustrated in FIG. 10, consumable article information, article classification information, contract style information, price information, and a product name are associated and stored in the consumable article information table. Information in the consumable article information table in this example may be referred to as associated information.

The explanation will be continued back to FIG. 3. The communication unit 320 communicates with the operation unit 20 via the network 40. The communication unit 320 is capable of transmitting a message which will be explained later and an order image to the operation unit 20 while receiving specifying information (information in which device information and article classification information are associated) and user identifying information transmitted from the operation unit 20, for example.

The authentication unit 330 performs an authentication of a user who uses the MFP 1. In the embodiment, the authentication unit 330 performs a control of transmitting a message requesting user identifying information from the operation unit 20 when the communication unit 320 receives specifying information from the operation unit 20, and performs an authentication processing of determining, when receiving in response the user identifying information (the set of the account name and the password) from the operation unit 20, whether or not a set that matches the set of the account name and the password constituting the received user identifying information is present among a plurality of sets (sets of account name and password) included in the contract information table. When the set that matches the set of the account name and the password constituting the user identifying information received from the operation unit 20 is present among the plurality of sets included in the contract information table, the authentication unit 330 authenticates the user who inputs the user identifying information. In other words, the user who inputs the user identifying information is determined to have an authority of using the consumable article purchase application. The authentication unit 330 then performs a control of transmitting the authentication result to the operation unit 20.

In this example, the first specifying unit 340, the second specifying unit 350, and the generator 360 which will be explained later operate only when the authentication unit 330 authenticates the user. As explained, the order image obtaining unit 280 in the operation unit 20 requests an order image from the server device 30 when receiving the authentication result indicating that the user is authenticated from the server device 30 in the embodiment. The first specifying unit 340, the second specifying unit 350, and the generator 360 which will be explained later operate upon the received request. The present invention is not limited thereto and the function of authenticating users may not be included, for example. In this configuration, the first specifying unit 340, the second specifying unit 350, and the generator 360 which will be explained later may operate upon the notification of the specifying information by the notification unit 260.

Next, the first specifying unit 340 and the second specifying unit 350 will be explained. The second specifying unit 350 will be explained first for the convenience of the explanation. The second specifying unit 350 specifies contract style information that indicates a contract style type of the MFP identified by the identifying information included in the device information notified by the notification unit 260 in the operation unit 20. In the embodiment, the second specifying unit 350 specifies contract style information corresponding to the specific serial number (corresponding to "specific information") included in the device information notified by the notification unit 260 among the plural pieces of contract style information stored in the storage unit 310 to specify contract style information of the MFP identified by the product name (corresponding to "identifying information") included in the device information notified by the notification unit 260.

In this example, since the product name of the MFP 1 is "MFP2013" and the device specific serial number is "2013-04-0001" as illustrated in FIG. 6, the second specifying unit 350 specifies the contract style information "A" corresponding to the device specific serial number "2013-04-0001" as contract style information of the MFP 1 identified by the product name "MFP2013" among the plural pieces of contract style information included in the contract information table illustrated in FIG. 9.

Next, the first specifying unit 340 will be explained. The first specifying unit 340 specifies consumable article information corresponding to the identifying information included in the device information notified by the notification unit 260 in the operation unit 20 among a plurality of pieces of consumable article information stored in the storage unit 310. More specifically, the first specifying unit 340 specifies, among the plurality of pieces of consumable article information and a plurality of pieces of price information stored in the storage unit 310, a combination of consumable article information and price information corresponding to the combination of the identifying information included in the device information notified by the notification unit 260 and the contract style information specified by the second specifying unit 350. To explain it still more specifically, the first specifying unit 340 specifies, among the plurality of pieces of consumable article information and the plurality of pieces of price information stored in the storage unit 310, a combination of consumable article information and price information corresponding to the combination of the identifying information included in the device information in the specifying information notified by the notification unit 260, the article classification information in the specifying information, and the contract style information specified by the second specifying unit 350 in the embodiment.

The product name (corresponding to "identifying information") included in the device information in the specifying information notified by the notification unit 260 is "MFP2013" and the contract style information specified by the second specifying unit 350 is "A" as explained above in this example. Here, when the article classification information in the specifying information notified by the notification unit 260 is "toner (T)" for example, the first specifying unit 340 is able to specify, as the combination of consumable article information and price information corresponding to the combination of the product name "MFP2013", the article classification information "T", and the contract style information "A" among combinations of consumable article information and price information included in the consumable article information table illustrated in FIG. 10: a combination of consumable article information "TONER 2013 BLACK" and price information "10,000 YEN"; a combination of consumable article information "TONER 2013 CYAN" and price information "10,000 YEN"; a combination of consumable article information "TONER 2013 MAGENTA" and price information "10,000 YEN"; and a combination of consumable article information "TONER 2013 YELLOW" and price information "10,000 YEN".

The generator 360 illustrated in FIG. 3 will be explained next. The generator 360 generates an order image that encourages an order of a consumable article indicated by the consumable article information specified by the first specifying unit 340. In the embodiment, the generator 360 associates the consumable article information specified by the first specifying unit 340 with the price information specified by the first specifying unit 340 to generate an order image to present. When the first specifying unit 340 specifies, as shown in the example above: the combination of the consumable article information "TONER 2013 BLACK" and the price information "10,000 YEN"; the combination of the consumable article information "TONER 2013 CYAN" and the price information "10,000 YEN"; the combination of the consumable article information "TONER 2013 MAGENTA" and the price information "10,000 YEN"; and the combination of the consumable article information "TONER 2013 YELLOW" and the price information "10,000 YEN" for example, the generator 360 is able to generate the order image illustrated in FIG. 11.

In the embodiment, the generator 360 associates the consumable article information specified by the first specifying unit 340 with announcing information appropriate to a remaining quantity indicated by the remaining quantity information included in the device information notified by the notification unit 260 to generate an order image to present. When a plurality of kinds of consumable article information are specified by the first specifying unit 340, and first consumable article information whose remaining quantity indicated by remaining quantity information corresponding to relevant consumable article information is equal to or less than a threshold value and second consumable article information whose remaining quantity indicated by remaining quantity information corresponding to relevant consumable article information is more than the threshold value are present in the specified plurality of kinds of consumable article information, for example, the generator 360 is also able to generate an order image in which information obtained by associating the first consumable article information and announcing information indicating that the remaining quantity is small is arranged above the second consumable article information.

Here, assumed is such a case like the example explained above that the consumable article information "TONER 2013 BLACK", the consumable article information "TONER 2013 CYAN", the consumable article information "TONER 2013 MAGENTA", and the consumable article information "TONER 2013 YELLOW" are specified by the first specifying unit 340. In this example, remaining quantity information that shows the remaining quantity of the "black toner (T-B)", remaining quantity information that shows the remaining quantity of the "cyan toner (T-C)", remaining quantity information that shows the remaining quantity of the "magenta toner (T-M)", and remaining quantity information that shows the remaining quantity of the "yellow toner (T-Y)" which are equipped (currently equipped) in the MFP 1 respectively indicate 20%, 80%, 80%, and 80%, as illustrated in FIG. 7. Here, the remaining quantity information corresponding to the consumable article information "TONER 2013 BLACK" is the remaining quantity information for the remaining quantity of "T-B". Similarly, the remaining quantity information corresponding to the consumable article information "TONER 2013 CYAN" is the remaining quantity information for the remaining quantity of "T-C". The remaining quantity information corresponding to the consumable article information "TONER 2013 MAGENTA" is the remaining quantity information for the remaining quantity of "T-M". The remaining quantity information corresponding to the consumable article information "TONER 2013 YELLOW" is the remaining quantity information for the remaining quantity of "T-Y".

When the threshold value is 30%, for example, the remaining quantity "20%" indicated by the remaining quantity information corresponding to the consumable article information for the "TONER 2013 BLACK" is equal to or less than the threshold value and the other remaining quantities indicated by the remaining quantity information corresponding to the other consumable article information are more than the threshold value. In this case, the generator 360 is able to generate an order image in which information obtained by associating the consumable article information "TONER 2013 BLACK" and the announcing information indicating that the remaining quantity is small (information "almost empty" in the example in FIG. 11) is arranged above the other consumable article information, as illustrated in FIG. 11. Such an order image as explained above is generated, so that a user who sees the order image is able to promptly recognize that an exchange of "TONER 2013 BLACK" equipped in the MFP 1 is needed. The consumable article information for the "TONER 2013 BLACK" may be referred to as first consumable article information and each of the consumable article information for "TONER 2013 CYAN", "TONER 2013 MAGENTA", and "TONER 2013 YELLOW" may be referred to as second consumable article information. Besides, the threshold value is not limited to 30% and the value may be changed arbitrarily.

The generator 360 performs a control of transmitting the order image generated in the manner explained above to the operation unit 20. The order image generated by the generator 360 is thus transmitted by the communication unit 320 to the operation unit 20.

While the CPU 31 uses the RAM 33 as a work area (work space) and executes programs stored in the ROM 32 or the HDD 34 to realize the functions of the communication unit 320, the authentication unit 330, the first specifying unit 340, the second specifying unit 350, and the generator 360 explained above, the present invention is not limited thereto and at least a part of the functions of the units of the server device 30 may be, for example, realized by a dedicated hardware circuit (semiconductor integrated circuit and the like, for example). Moreover, the storage unit 310 may be realized by the ROM 32, the HDD 34, and the like, for example.

Figure 12:
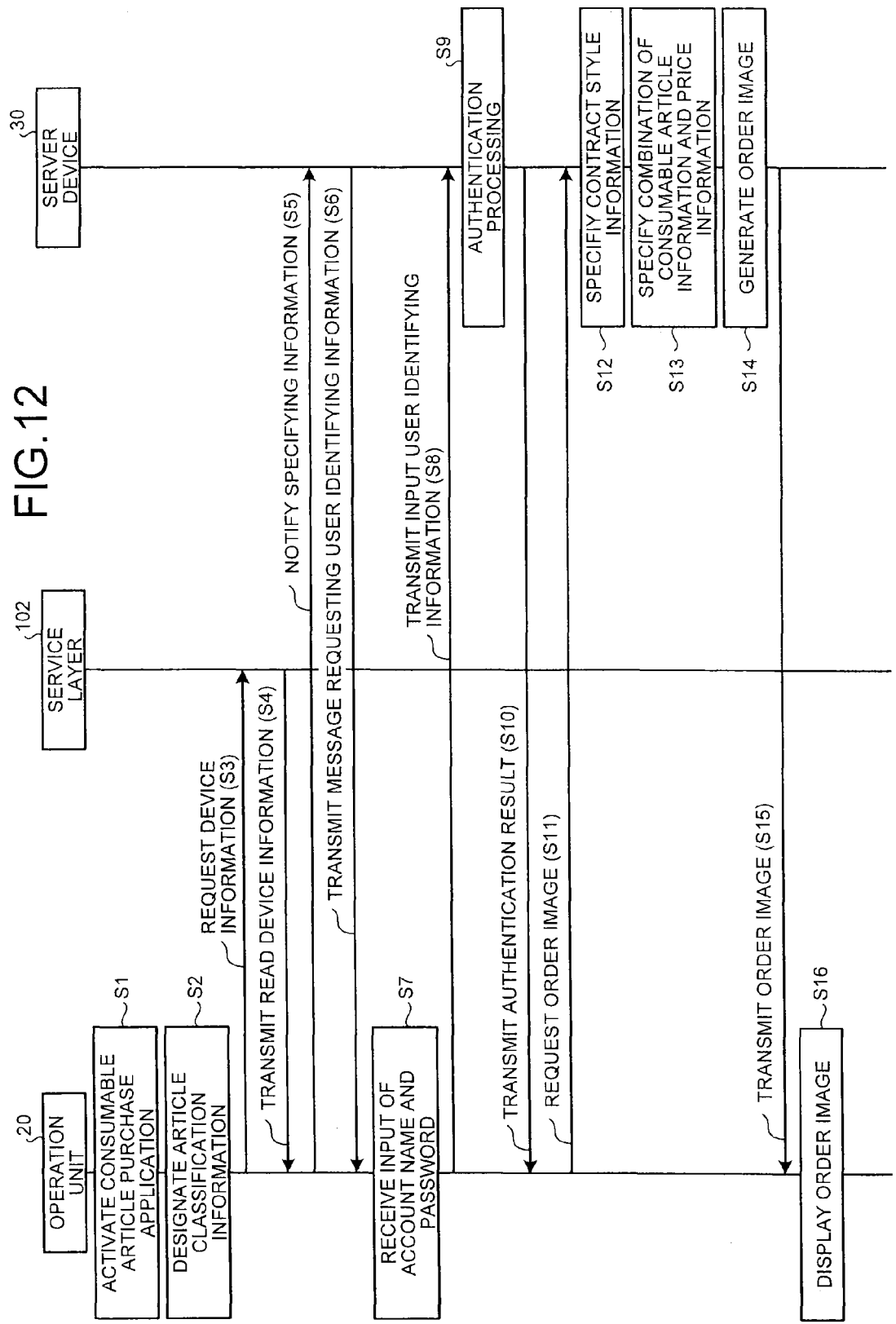
FIG. 12 is a sequence diagram illustrating an example of an operation procedure in the information processing system.

FIG. 12 is a sequence diagram illustrating an example of an operation procedure in the information processing system 100 according to the embodiment. Here, an example of an operation procedure in the information processing system 100 in a case where a user uses the consumable article purchase application will be explained. First, when a user performs an operation of touching the icon 50 corresponding to the consumable article purchase application, the operation unit 20 (the activation processor 230) performs a control of activating the consumable article purchase application (step S1). As explained, when the consumable article purchase application is activated, the operation unit 20 (the display unit 220) performs a control of displaying a selection screen that encourages a selection of any one of: a designation of a classification of consumable articles to order; a display of an order history; and a transition to the home screen, and the operation unit 20 (the designation unit 240) designates article classification information in accordance with the input from the user (step S2).

Next, the operation unit 20 (the device information obtaining unit 250) requests device information including device identifying information and remaining quantity information from the service layer 102 of the main body 10 (step S3). The service layer 102 having received this request in the main body 10 reads out and transmits to the operation unit 20 device information stored in a not illustrated memory in the main body 10 (step S4).

Next, the operation unit 20 (the notification unit 260) notifies the server device 30 of the specifying information including the obtained device information and the article classification information designated at step S2 (step S5). The server device 30 having received the notification of the specifying information transmits a message for requesting user identifying information to the operation unit 20 (step S6). The operation unit 20 (the authentication controller 270) having received this message displays a login screen that encourages an input of user identifying information to be used for user authentication and receives an input of an account name and a password (step S7). The operation unit 20 (the authentication controller 270) then transmits the set of the input account name and the password (user identifying information) to the server device 30 (step S8). When receiving the user identifying information from the operation unit 20, the server device 30 (the authentication unit 330) performs an authentication processing of determining whether or not a set that matches the set of the account name and the password constituting the received user identifying information is present among the plurality of sets (sets of account name and password) included in the contract information table (step S9), and transmits the authentication result to the operation unit 20 (step S10).

When receiving the authentication result that indicates that the user is authenticated, the operation unit 20 (the order image obtaining unit 280) requests an order image from the server device 30 (step S11). The server device 30 (the second specifying unit 350) having received this request specifies contract style information corresponding to the device specific serial number included in the device information in the specifying information notified at step S5 among a plurality of pieces of contract style information stored in the storage unit 310 (step S12). Next, the server device 30 (the first specifying unit 340) specifies, among the plurality of pieces of consumable article information and the plurality of pieces of price information stored in the storage unit 310, a combination of consumable article information and price information corresponding to the combination of the identifying information included in the device information in the specifying information notified at step S5, the article classification information in the specifying information, and the contract style information specified at step S12 (step S13). Next, the server device 30 (the generator 360) associates the consumable article indicated by the consumable article information specified at step S13 with the price indicated by the price information specified at step S13 to generate an order image to present (step S14). The server device 30 transmits the order image generated at step S14 to the operation unit 20 (step S15).

Next, the operation unit 20 (the display unit 220) displays the order image obtained from the server device 30 on the operation panel 27 (step S16). The user is able to place an order by selecting a desired consumable article for purchase through a touch operation while watching the order image displayed on the operation panel 27 as illustrated in FIG. 11.

As explained so far, since an order image in which only a consumable article that is available in the MFP 1 used by the user is presented is displayed on the operation panel 27 when the consumable article purchase application is executed in the embodiment, it is not necessary for the user to look for a consumable article that is available in the MFP 1 used by the user from the consumable articles presented in an order image. It is thus possible to achieve an advantage of improving convenience for users.

Modifications

Modifications will be explained below. Modifications below will be arbitrarily combined. Besides, the modifications may be arbitrarily combined with the embodiment.

First Modification

The device information may further include contract style information, for example. The device identifying information may include contract style information in addition to a product name and a device specific serial number, for example. In this case, since the second specifying unit 350 is able to specify the contract style information from the device information notified by the notification unit 260, the contract information table becomes unnecessary.

Second Modification

The remaining quantity information may not be notified to the server device 30, for example. In this case, the operation unit 20 may generate the announcing information and display, by superimposing on the order image generated in the server device 30, the generated announcing information on the operation panel 27. The announcing information may not be displayed in the order image, for example.

Third Modification

The operation unit 20 may receive the consumable article information and the like specified by the first specifying unit 340 of the server device 30 and may generate and display the order image. In other words, the generator 360 may be equipped in the operation unit 20. In essence, the functions of the units in the information processing system 100 can be arbitrarily distributed and equipped in the main body 10, the operation unit 20, and the server device 30.

Fourth Modification

The designation unit 240 may not be provided (article classification may not be designated), for example. In this case, the storage unit 310 may store, by associating each piece of identifying information (product name) with, contract style information, consumable article information, and price information and the first specifying unit 340 may specify, among the plurality of pieces of consumable article information and the plurality of pieces of price information stored in the storage unit 310, a combination of consumable article information and price information corresponding to a combination of identifying information included in the device information notified by the notification unit 260 and contract style information specified by the second specifying unit 350.

Fifth Modification

The storage unit 310 may not store contract style information, for example. In this case, the storage unit 310 may store, by associating each piece of identifying information with, at least consumable article information (may store, by associating each piece of identifying information with, consumable article information and price information, for example) and device identifying information included in device information may only be identifying information, for example. The identifying information in this case may be a product name or a device specific serial number. In essence, information capable of identifying the MFP 1 will do. The first specifying unit 340 may then specify, among the plurality of pieces of consumable article information stored in the storage unit 310, consumable article information corresponding to identifying information included in the device information notified by the notification unit 260, and the generator 360 may generate an order image that encourages an order of a consumable article indicated by the consumable article information specified by the first specifying unit 340.

Sixth Modification

Figure 13:
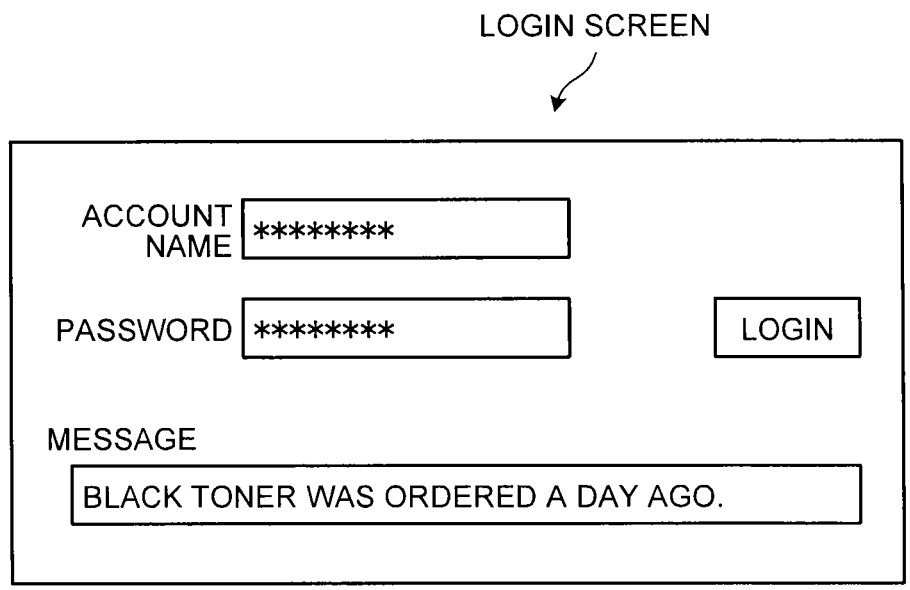
FIG. 13 illustrates an example of a modification of a login screen.

When a login screen is displayed as illustrated in FIG. 13, a message for announcing a status of the most recent order (a message "black toner was ordered a day ago" in the example in FIG. 13) may be displayed in combination, for example.

Seventh Modification

While the main body 10 and the operation unit 20 operate independently with each other in separated operating systems in the embodiment, the present invention is not limited thereto and the main body 10 and the operation unit 20 may operate in the same operating system, for example.

Program

The program to be executed in the information processing system 100 according to the embodiment may be provided by being recorded in a file of an installable format or of an executable format in a computer-readable recording medium such as a CD-ROM, a flexible disk (FD), a CD-R, a digital versatile disk (DVD), and a universal serial bus (USB), or may be provided or distributed via a network such as the Internet. Besides, various programs may be provided by being preloaded in a ROM and the like.

According to the embodiments, it is possible to improve convenience for users.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multifunction peripheral (MFP) configured to communication with an external server device via a network, the MFP comprising:
    a main body including a first central processing unit (CPU), a first operating system (OS), a service layer configured to provide an interface for a hardware resource of the main body, and an image forming device; and
    an operation device including a second CPU, a second OS, an application running under the second OS, and a user interface to operate at least the image forming device, wherein
    the operation device transmits a request to transmit identifying information for identifying the MFP to the service layer, the service layer transmitting the identifying information to the operation device in response to the request, and
    the operation device receives the identifying information from the service layer, and transmits the received identifying information and article classification information that indicates a classification of consumable articles to the external server device, the consumable articles being designated by user input via the operation device.

2. The MFP according to claim 1, wherein the identifying information is included in device information and the external server device with which the MFP communicates includes
    a memory configured to store the identifying information and consumable article information that indicates a consumable article available in the MFP identified by the identifying information so that each type of the identifying information is associated with the corresponding consumable article information;
    a first specifying unit, implemented by circuitry, configured to specify, among a plurality of pieces of consumable article information stored in the memory, a piece of consumable article information associated with the identifying information;
    a generator, implemented by the circuitry, configured to generate an order image that encourages an order of a consumable article indicated by the piece of consumable article information specified by the first specifying unit; and
    a second specifying unit, implemented by the circuitry, configured to specify contract style information that indicates a contract style type of the MFP identified by the identifying information included in the device information, wherein
    the memory is configured to store the identifying information, the contract style information, the consumable article information, and price information that indicates a price of the consumable article so that each type of the identifying information is associated with the corresponding contract style information, the corresponding consumable article information, and the corresponding price information, the first specifying unit is configured to specify, among the plurality of pieces of consumable article information and a plurality of pieces of price information stored in the memory, a combination of a piece of consumable article information and a piece of price information corresponding to a combination of the identifying information included in the device information and the contract style information specified by the second specifying unit, and the generator is configured to generate the order image to present the piece of consumable article information specified by the first specifying unit and the piece of price information specified by the first specifying unit so that the piece of consumable article information and the piece of price information are associated with each other.

3. The MFP according to claim 2, wherein the price indicated by the price information stored in the memory is set differently depending on the contract style information associated with the price information.

4. The MFP according to claim 2, wherein the operation device is configured to designate the article classification information that indicates the classification of consumable articles, the operation device is configured to notify the external server device of specifying information including the identifying information and the article classification information, the memory is configured to store the identifying information, the article classification information, the contract style information, the consumable article information, and the price information so that each type of the identifying information is associated with the corresponding article classification information, the corresponding contract style information, the corresponding consumable article information, and the corresponding price information, and the first specifying unit is configured to specify, among the plurality of pieces of consumable article information and the plurality of pieces of price information stored in the memory, a combination of a piece of consumable article information and a piece of price information corresponding to a combination of the identifying information and the article classification information included in the specifying information notified by the operation device and the contract style information specified by the second specifying unit.

5. The MFP according to claim 2, wherein the device information includes specific information that indicates information specific to the MFP, the memory is configured to store the specific information and the contrast style information so that each type of the specific information is associated with the corresponding contrast style information, and the second specifying unit is configured to specify, among a plurality of pieces of contract style information stored in the memory, a piece of contract style information corresponding to the specific information included in the device information.

6. The MFP according to claim 2, wherein the device information includes the contract style information that indicates a contract style type of the corresponding MFP, and the second specifying unit is configured to specify the contract style information included in the device information.

7. The MFP according to claim 2, wherein the device information includes remaining quantity information that indicates a remaining quantity of a consumable article equipped in the MFP, and the generator is configured to generate the order image to present the piece of consumable article information specified by the first specifying unit and announcing information appropriate to the remaining quantity indicated by the remaining quantity information so that the piece of consumable article information and the announcing information are associated with each other.

8. The MFP according to claim 7, wherein a plurality of types of the consumable article information are specified by the first specifying unit, the plurality of types of the consumable article information include first consumable article information in which a remaining quantity indicated by the remaining quantity information for the corresponding consumable article is equal to or less than a threshold value and second consumable article information in which a remaining quantity indicated by the remaining quantity information for the corresponding consumable article is more than the threshold value, and the generator is configured to generate the order image in which information in which the first consumable article information and the announcing information indicating that the remaining quantity is small are associated with each other is arranged above the second consumable article information.

9. The MFP according to claim 2, wherein the external server device with which the MFP communicates includes a memory configured to store the identifying information and consumable article information that indicates a consumable article available in the MFP identified by the identifying information so that each type of the identifying information is associated with the corresponding consumable article information;

a first specifying unit, implemented by circuitry, configured to specify, among a plurality of pieces of consumable article information stored in the memory, a piece of consumable article information associated with the identifying information; and a second specifying unit, implemented by the circuitry, configured to specify contract style information that indicates a contract style type that is associated with a set number of visits by a service person for servicing the MFP identified by the identifying information.

10. A method for a multifunction peripheral (MFP) that is configured to communication with an external server device via a network, the MFP including a main body that includes a first central processing unit (CPU), a first operating system (OS), a service layer configured to provide an interface for a hardware resource of the main body, and an image forming device, and the MFP including an operation device that includes a second CPU, a second OS, an application running under the second OS, and a user interface to operate at least the image forming device, the method comprising:

transmitting, by the operation device of the MFP, a request to transmit identifying information for identifying the MFP to the service layer, the service layer transmitting the identifying information to the operation device in response to the request;

receiving, by the operation device of the MFP, the identifying information from the service layer; and transmitting, by the operation device of the MFP, the received identifying information and article classification information that indicates a classification of consumable articles to the external server device, the consumable articles being designated by user input via the operation device.

\* \* \* \* \*